Figure 1:
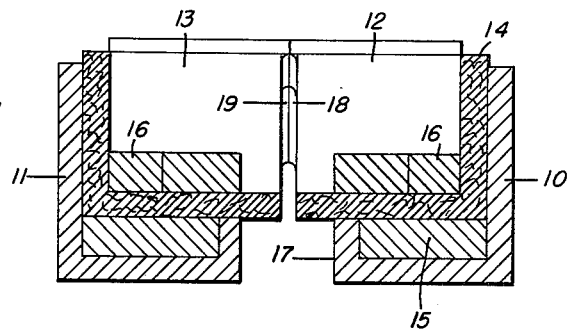

Dec. 28, 1965  N. HANSJOSTEN  3,225,388
MOLD FOR THE PRODUCTION OF SHOES
Filed June 13, 1963  5 Sheets—Sheet 1

Dec. 28, 1965  N. HANSJOSTEN  3,225,388
MOLD FOR THE PRODUCTION OF SHOES
Filed June 13, 1963  5 Sheets-Sheet 2

United States Patent Office 3,225,388
Patented Dec. 28, 1965

3,225,388
MOLD FOR THE PRODUCTION OF SHOES
Nikolaus Hansjosten, Pluwig, Kreis Trier, Germany
Filed June 13, 1963, Ser. No. 287,706
4 Claims. (Cl. 18—34)

This application is a continuation-in-part of my copending application Serial No. 694,841 filed November 6, 1957, for "Mold for Shoe Soles," now abandoned.

According to known processes, the attachment of an unvulcanized or prevulcanized sole to a united or joined upper and insole mounted on a last has been accomplished by heated molds, which molds include a heated base plate, a frame positioned on the base plate corresponding to the outer configuration of the edge of the sole, and a clamping device between the base plate and the last. The last is placed in a hinged mounting, the outer sole which is stamped to about 1 cm. larger than the final form of the sole is positioned on the base plate, the frame is disposed on the stamped outer sole with its position in relation to the base plate being determined by suitable guide means, and an intermediate sole or a corresponding unvulcanized or prevulcanized mix such as a sponge rubber mix is introduced into the frame which is closed at its bottom by the stamped outer sole. The mold is then closed by clamping the last carrying the joined upper and insole, whereby the top of the frame is closed and vulcanization is effected.

The foregoing known process is disadvantageous in that the outer sole which serves to a certain extent as a seal between the base plate and the frame projects completely around the frame and this requires that the portions which project laterally beyond the intermediate sole located above the outer sole and which is formed in the mold must subsequently be removed by trimming. This trimming step requires additional labor and it is customary to trim the sole manually. Furthermore, this process occasions unnecessary expense by virtue of the wasted material and, in addition, the strength of the junction between the outer sole and the intermediate sole is affected.

The above and other disadvantages are lessened according to another known technique wherein the sole is not positioned between the base plate and the frame to serve as a seal, but is made in its final size. The sole is positioned in a mold which consists of a base plate and frame, but the joint on the sole side between the frame and the base plate is located in the zone of the underside of the wear surface of the sole and, since the outer sole is prevulcanized, there is provided a reliable seal in this zone.

This invention constitutes an improvement over my application Serial No. 593,716 filed June 25, 1956, now Patent No. 3,014,244. The advantage of this construction is that no attention is given to the joint and a substantial saving in labor is realized by the reduction in the number of mold components. As no importance is attached to an upper edge on the sole at its juncture with the upper, such as in the manufacture of simple house shoes, the sealing of the mold is effectively realized by the lasted upper and the shoe can be moved upwardly. If, however, the sole is provided with an upper edge at its juncture with the upper since, for example, the same is to have greater outer dimensions than the upper, the division of the frame which is necessary for a satisfactory removal of the shoe is such that the joint does not divide or separate the frame and base plate into two independent components, but the joint or plurality of joints extend substantially vertically, that is to say, normal to the sole. By virtue thereof, the independent mold components each include a portion of the base plate and also the frame. The number of joints is not of particular significance and the same is true whether the joints are inclined, stepped or of similar form, but of material importance is the fact that the division of the mold into the frame and the base plate is eliminated.

Originally the division between the frame and base plate was based on the premise that the prevulcanized outer sole could be used as a sealing means, and this prevented extrusions through the gaps of the joint. In addition, the placement of the joint gap to the underside of the insole served the same purpose.

However, it was already customary in known constructions with a separate frame and base plate to divide the frame into two components in the longitudinal direction. This arrangement presented the further disadvantage that instead of two mold components, namely, the base plate and the frame, there were now three components although, of course, the two frame parts generally were interconnected by means of a hinge and a catch. This particular joint did not result in any particular extrusion since the joint was maintained quite small and as a consequence quite well finished. Even if there was an extrusion the same was not particularly objectionable since it would be very slight.

The invention unites the frame and base plate firmly together and the joint extends in the manner of joints employed in separate frames. While the joint is substantially greater since it extends the full length of the sole, this is not objectionable in view of the fact that this part of the joint is covered by the prevulcanized outer sole. The joint or joints can extend in directions other than the longitudinal direction in accordance with the particular configuration of the sole being produced.

When a rectangular box-shaped sole mold is employed, the joint can extend parallel to the longitudinal sides or can include two part joints which are planar and substantially vertically disposed which intersect in the center of the rearward end of the wear or tread surface of the sole and extending from such intersection forward to the center of the toe portion and rearward to the center of the heel portion. It is to be understood, however, that a curved joint can be employed which at all points along its length is equidistant from the two side edges of the sole.

For improving the tightness of the joint, the joint is not extended over the full depth of the mold, but the contacting surfaces are limited only to a zone immediately adjacent the sole. More particularly, the same extend only over a part of the thickness of the mold, in which situation the contacting surfaces have a width of approximately 1 cm.

It is further desirable to incorporate with the mold dowels and guide apertures which can be provided in the contacting surfaces as well as in the non-contacting components of the joint.

It is further advantageous to provide means for moving all of the components in such a manner that the mold can be opened and closed by a single operating lever, and this can be accomplished by means of hinges, as known, for use with the frame.

Separate guides can be provided wherein the mold box which is divided vertically along its length by the joint, can be opened and closed by parallel movements of the mold components towards and away from each other.

Figure 3:
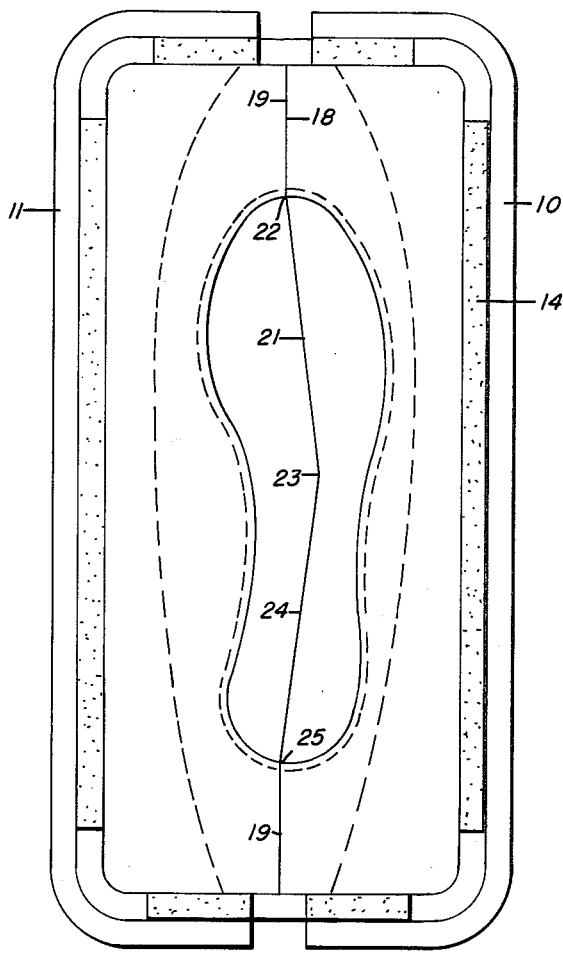
Figure 2:
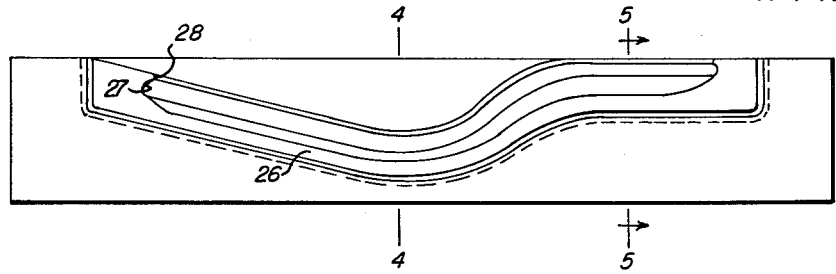
Figure 4:
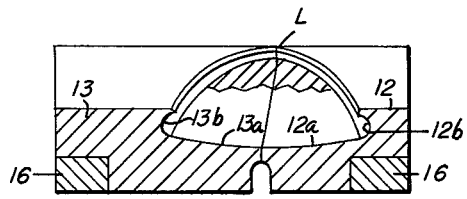
Figure 5:
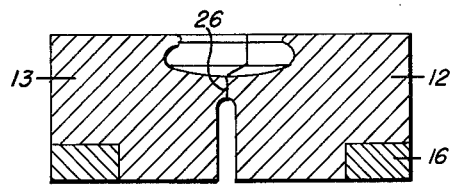
Figure 8:
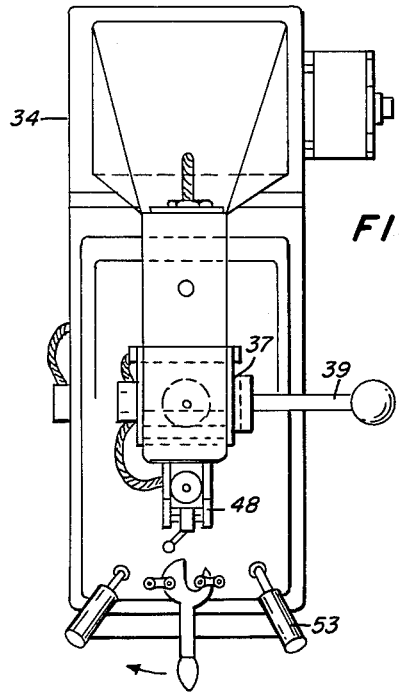
Figure 9:
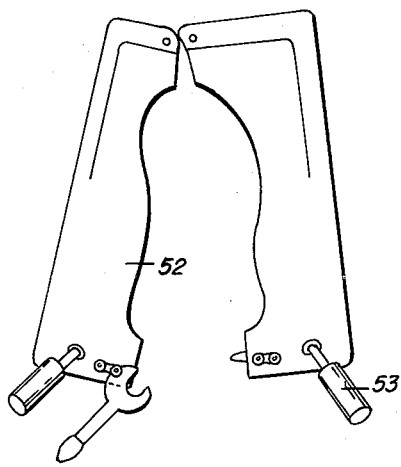
Figure 6:
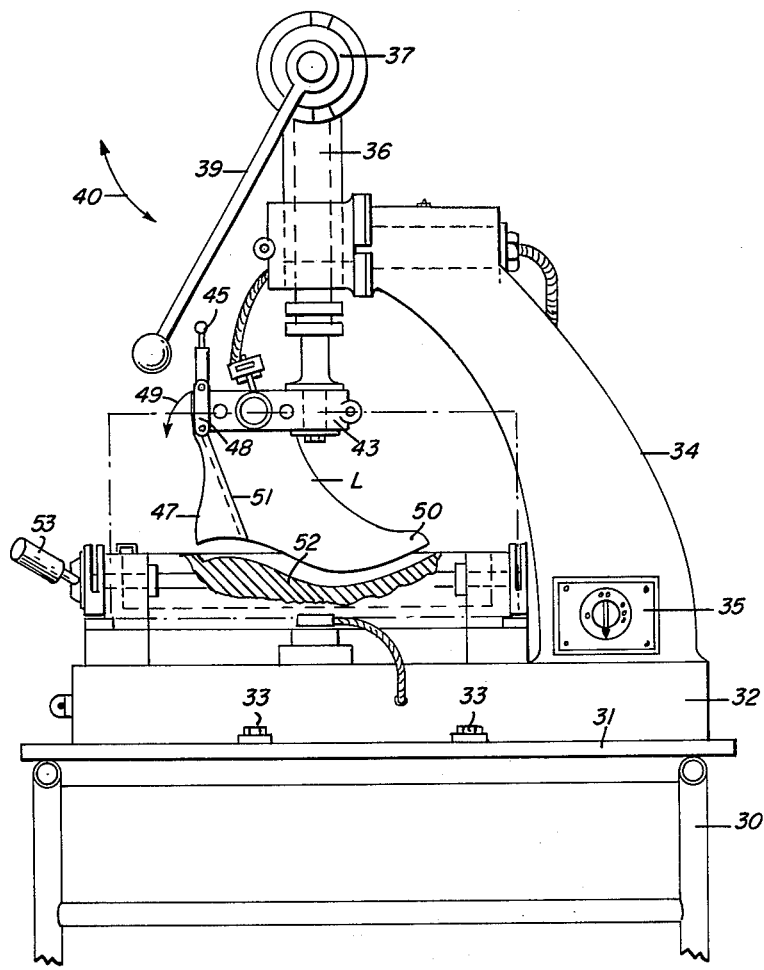
Figure 7:
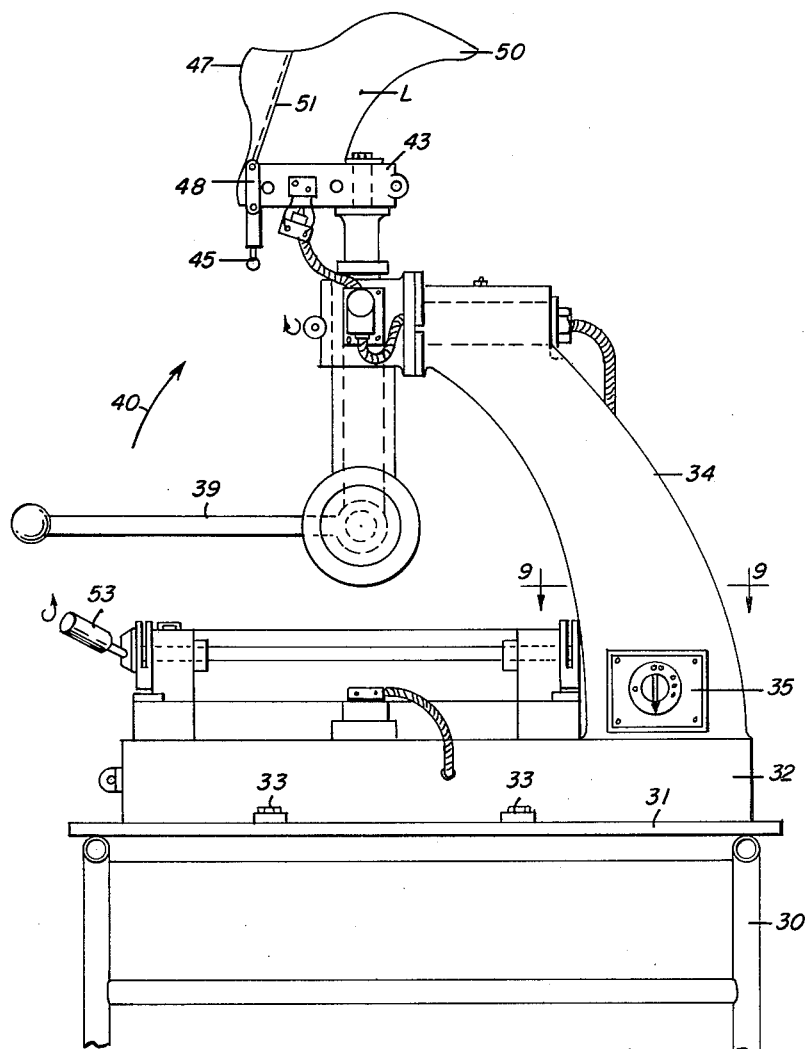
Figure 7A:
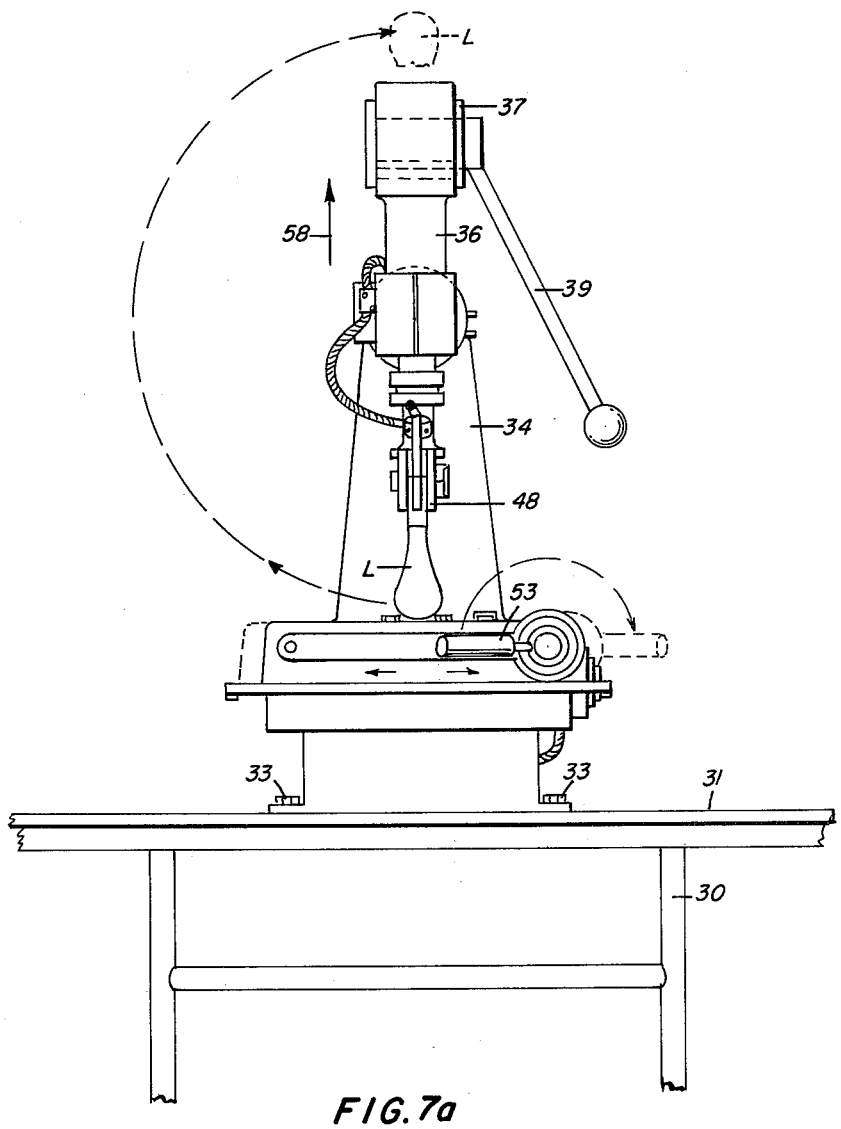

Further objects and advantages of the invention will become more readily apparent from the following detailed description and annexed drawings, in which:

FIGURE 1 is a vertical sectional view of a vulcanizing mold according to the present invention, FIGURE 2 is a side elevational view of the joint looking toward the left hand mold half of FIGURE 1, FIGURE 3 is a plan view of the mold shown in FIGURE 1, FIGURE 4 is a view taken along the line IV—IV of FIGURE 2, FIGURE 5 is a view taken along the line V—V of FIGURE 2, FIGURE 6 is a side elevational view, partly in cross section, illustrating the last located above the mold, FIGURE 7 is a view generally similar to FIGURE 6, with the last moved upwardly for receiving the joined upper and insole, FIGURE 7a is a view taken at right angles to FIGURE 6, FIGURE 8 is a plan view of the apparatus shown in FIGURE 6, and FIGURE 9 is a sectional view taken along the line IX—IX of FIGURE 7.

As shown in FIGURES 1 and 3, the mold includes an outer substantially rectangular box defined by two half boxes 10 and 11. Mold parts 12 and 13 are located in the respective boxes, with an asbestos filler 14 and solid filler 15 being interposed between the mold parts and the boxes. Each mold part is independently and adjustably heated by means of a heated bar or the like 16.

The mold halves cooperate to provide a molding cavity C of the desired configuration. Areas or surfaces 12a, 13a provide the base plate while areas or surfaces 12b, 13b constitute the frame, as referred to in my Patent No. 3,014,244.

In FIGURE 3, it will be noted that the box halves 10, 11 terminate at the inside along the broken lines 17, so that such halves do not contact one another. The contact is effected at joint 18 between the mold parts 12, 13. The joint 18 extends along four planes. Planes 19 and 20 are located without the sole area and extend parallel to the sides of the box as well as being arranged in the center thereof. Plane 21 extends from the center of the toe portion, as indicated at 22, rearwardly to a point 23 located at the center of the rearward edge of the actual wear or tread surface. Plane 24 extends rearwardly from the point 23 to the center of the heel portion, as indicated at 25, at which point it joins the plane 20. Thus, there is provided an irregular discontinuous line which follows the so-called orthopedic axis of the sole.

As shown in FIGURES 2 and 5, contacting surfaces 26 of the joint are limited to a part only of the thickness of the mold surface, and such surfaces have a breadth of approximately 1 cm. The form of sole illustrated has a rounded edge, as indicated at 27, and an upper edge 28 which renders impossible the direct withdrawal of the sole. To permit the direct withdrawal, means are provided for the separation of the mold parts 12, 13.

It will further be noted in FIGURES 2 and 3, that the sole is of highly arched form so that a heel may subsequently be attached to the sole by nailing or the like. It will be further noted, in FIGURE 4, that the mold is provided with a transverse curvature. In other words, the mold includes longitudinal and transverse curvatures.

The upper open end of the mold cavity C can be closed by means of a last L carrying a joined or united upper and insole.

The operation of the mold can be effected by relatively simple means as shown in FIGURES 6–9.

As shown in FIGURE 6, a stand 30 having a table 31 on which base 32 is mounted by screws 33. A supporting arm 34 cast with the base 32 has at its lower end a switch 35 for the electric heating of the bars of the mold. At the upper end of the arm, via a shaft 35 shown in dotted lines, there is connected a swinging arm 36, at one end of which is located a bearing 37 for lowering axle or shaft 38 which, by means of a lever 39, can be actuated in the directions shown by arrow 40, and functions by means of a pinion on a rack disposed at the end of a piston 41 which is slidably but non-rotatably mounted in the arm 36. At the end of plunger 41 is provided a clamping means 42, 43 for last L so that, by actuation of the lever 39 in the direction of the arrow 40, the last can be moved up and down in the direction of double arrow 40'. The last includes an electric heating means which receives its current through cable 45, and the temperature can be determined from a thermometer 46.

The last L is formed in two parts. Heel part 47 is shiftable downward against main last 50 in the direction of arrow 49 by means of a toggle component 48, with separating line 51 running obliquely so that a joined upper and insole can be pulled over the toe portion and stretched by moving the heel part 47 back up by means of component 48 in a direction opposite to that of arrow 49.

On the base 32 is positioned a mold plate 52 on which the mold shown in FIGURES 4 and 5 is mounted. The heating bars 16 of the two mold halves 12 and 13 receive their current by electric cable 53. The mold halves 12 and 13 can be moved apart by a lever 54 adapted to be swung in the direction of the arrow 55, and such halves are then in the position shown in dotted lines in FIGURE 9.

The apparatus is operated in such a manner that in the position shown in FIGURE 7 the upper with the insole is stretched on the last. Next, the prevulcanized outer sole is laid into the mold, and unvulcanized foam rubber granules or a corresponding mixture, to serve as intermediate sole, is placed into the mold. Further, felt shoes and filler pieces for the heel and such like are inserted. The last is then swung by the handle of the lever 39 in the direction of arrow 56 (FIGURE 6) and thus movement is indicated in FIGURE 7a, but the swinging movement downward takes place in the opposite direction to that of arrow 57. Next, the last with the upper is moved by lever 39 in a direction opposite to that of arrow 58 in FIGURE 7a (i.e. downward), thereby closing the mold. Subsequently, vulcanizing with heat takes place and, when the vulcanization has been completed, the mold is opened by actuation of lever 54 in the direction of arrow 55 of FIGURE 7a. The last is raised by actuation of lever 39 in the direction of arrow 58, swung upward in the direction of arrow 57 around the axle 35, and lever 48 is also swung in the direction of arrow 49 in FIGURE 7, so that the completed shoe can be removed.

This invention is not to be confined to any strict conformity to the showings in the drawings, but changes or modifications can be made therein so long as such changes or modifications mark no material departure from the spirit and scope of the appended claims.

What is claimed is:

1. A mold, particularly a vulcanizing mold, for the production of a shoe having an outer sole punched from prevulcanized rubber or similar sheet material of uniform thickness and having a tread surface, an intermediate sole of moldable material and an upper and insole joined to the intermediate sole, comprising two half boxes, a mold section located in each box for providing a unitary mold component, said box halves having inner surfaces terminating in spaced relationship, means defining at least one vertical joint between such sections located substantially equidistant from the two lateral edges of the sole along the length of the joint, said mold sections jointly forming a molding cavity having longitudinal and transverse curvatures and an open end, each section having a base surface and a substantially vertical perimetric surface cooperable with the base surface to provide the outer edge of the entire sole with said base surfaces adapted to receive the outer sole, the molding cavity being adapted to receive a moldable material for forming the intermediate sole, and a last carrying the united upper and insole adapted to close the open end of the molding cavity and said outer sole serving for sealing the vertical joint between the sections.

2. A mold as claimed in claim 1, in which the contacting surfaces of the joint are limited to a part only of the thickness of the mold surface and have a breadth of approximately 1 cm.

3. A mold as claimed in claim 1, in which said two mold sections are movable toward and away from each other to define the molding cavity, cooperable guide means for said sections, and a single operating lever operatively connected to the sections to move the sections toward and away from each other.

4. The mold as claimed in claim 3, wherein said joint includes an obtuse angle at approximately the rear end of the tread surface of the outer sole, and portions extending from such rear end to the center of the toe and center of the heel, respectively.

References Cited by the Examiner

UNITED STATES PATENTS

| | | | |
|---|---|---|---|
| 1,807,487 | 5/1931 | McGhee | 264—244 |
| 2,256,329 | 9/1941 | Szerenyi | 264—244 |
| 2,499,565 | 3/1950 | Booth | 18—42 |
| 2,820,251 | 1/1958 | Fraser | 18—34 |
| 2,878,523 | 3/1959 | Hardy | 264—244 |
| 2,945,260 | 7/1960 | Bell | 18—42 |
| 2,961,707 | 11/1960 | Stewart | 18—34 |
| 3,014,244 | 12/1961 | Hansjosten | 18—34 |
| 3,021,572 | 2/1962 | Smith | 264—244 |

FOREIGN PATENTS

| | | |
|---|---|---|
| 569,361 | 7/1958 | Belgium. |
| 75,993 | 9/1947 | Czechoslovakia. |
| 851,818 | 10/1960 | Great Britain. |

OTHER REFERENCES

German application Das 1,043,148, November 1958.

J. SPENCER OVERHOLSER, *Primary Examiner.*

ROBERT F. WHITE, WILLIAM J. STEPHENSON,
*Examiners.*